United States Patent [19]

Ogawa et al.

[11] Patent Number: 5,174,107
[45] Date of Patent: Dec. 29, 1992

[54] COMBINED POWER GENERATING PLANT

[75] Inventors: Kiichiro Ogawa; Yasuko Osawa; Junsuke Miyake, all of Tokyo, Japan

[73] Assignee: Mitsubishi Jukogyo Kabushiki Kaisha, Tokyo, Japan

[21] Appl. No.: 891,662

[22] Filed: May 29, 1992

Related U.S. Application Data

[63] Continuation of Ser. No. 549,450, Jul. 6, 1990, abandoned.

[30] Foreign Application Priority Data

Jul. 6, 1989 [JP] Japan ................................. 1-173042

[51] Int. Cl.⁵ .......................... F02B 43/00; F02B 3/00
[52] U.S. Cl. ................................ 60/39.12; 60/39.182; 122/7 B
[58] Field of Search ................. 60/39.12, 39.182; 122/7 B

[56] References Cited

U.S. PATENT DOCUMENTS

| | | | |
|---|---|---|---|
| 3,731,485 | 5/1973 | Rudolph et al. .............. | 60/39.12 |
| 4,238,923 | 12/1980 | Waryasz . | |
| 4,472,936 | 9/1984 | Uchiyama et al. ............ | 60/39.12 |
| 4,489,562 | 12/1984 | Snyder et al. . | |
| 4,831,817 | 5/1989 | Linhardt . | |
| 4,896,499 | 1/1990 | Rice ............................ | 60/39.182 |

FOREIGN PATENT DOCUMENTS 2047265 11/1990 United Kingdom .

OTHER PUBLICATIONS

2448 Progress in Energy and Combustion Science vol. 8 (1982) No. 4, Oxford, Great Britain.

Primary Examiner—Michael Koczo
Assistant Examiner—Howard R. Richman
Attorney, Agent, or Firm—Anderson Kill Olick & Oshinsky

[57] ABSTRACT

The present invention has been realized in order to treat noxious and combustible gases, which are exhausted during the start-up operation of a composite coal gasification-power plant and/or released from various safety valves arranged in such power plant and which have hitherto been discharged without treatment into the atmosphere, to make it innoxious and to attain an efficient energy utilization and concerns an improvement of such a composite coal gasification-power plant, which is characterized either in that an additional combustion unit is disposed parallel to the burner of the gas-turbine electric power generating unit and is arranged so as to supply the combustion exhaust gas of this additional combustion unit to as to supply the combustion exhaust gas of this additional combustion unit to the waste heat boiler, or in that an additional combustion unit, operative to effect to burn the noxious and combustible gases exhausted from the burner during start-up and/or those released from safety valves arranged in the power plant and to supply the combustion exhaust gas to said waste heat boiler, is arranged.

2 Claims, 4 Drawing Sheets

COMBINED POWER GENERATING PLANT

This is a continuation application of Ser. No. 07/549,450, filed Jul. 6, 1990, now abandoned.

FIELD OF THE INVENTION AND RELATED ART STATEMENT

The present invention relates to a composite coal gasification-power plant and, in particular, to a technical means for treating noxious and combustible gases appearing during start-up operation of such power plant and/or those released from safety valves arranged in such plant so as to deprive dangers and toxicity of these gases.

A typical layout of conventional composite coal gasification-power plant is shown in FIG. 3. The plant of FIG. 3 includes a coal gasifying furnace 1, which is fed by coal and gasifying agents, such as, air, oxygen, steam and so on, to cause reaction between them under a condition of high temperature and high pressure to produce a fuel gas composed mainly of carbon monoxide and hydrogen. The so produced gas is passed to a gas cooler 2 composed of a set of heat exchangers employed for sucking up the sensible heat contained in the gas to the cooling water to thereby generate steam in order to attain an efficient heat utilization. The gas so cooled is then passed to a gas purification unit 3 composed of a dust separator, desulfurizer and so on to remove impurities in the gas, such as, dust, sulfur oxides and so on. The thus cleaned gas is then fed to a burner 4 to burn it. The combustion gas therefrom is then discharged into a gas turbine 5 to drive a power generator 6 and an air compressor 7. These elements 4,5,6 and 7 constitute a gas-turbine power generation unit.

The hot exhaust gas from the gas-turbine power generation unit is sent to a waste heat boiler 8 where it delivers its heat to water to generate steam, whereupon the spent gas is exhausted to the atmosphere through a chimney 9. The steam generated in the waste heat boiler 8 is fed, together with the steam generated in the gas cooler 2, to a steam turbine 10 in a steam-turbine power generation unit to drive a power generator 11.

In the conventional composite coal gasification-power plant as explained above, the product gas of the coal gasifying furnace 1 produced in the start-up period of the furnace operation appears also as a noxious gas due to contents of noxious and combustible gas components, until the running conditions and the gas composition will reach a steady state and the gas will be ready for combustion by the burner, so that release of these noxious gases as such into the atmosphere is undesirable in the point of view of environmental sanitation.

In the practice of the stand of technique, the warming-up operation of the coal gasifying furnace 1 and the gas purification unit 3 has been realized while burning out the noxious combustible gases produced during this warming-up period by a separately arranged gas-burning-out furnace (or a flare stack) 12, as shown in FIG. 3.

In a composite coal gasification-power plant, various safety means, such as, safety valves 13, pressure control valves 14, gas relief valves (not shown) and so on, are usually installed for security confirmation, as shown in FIG. 3. When these safety means are put into operation on occasion, noxious and combustible gases may be discharged as such into the atmosphere, which is also undesirable. In the conventional practice, the gases released from these safety means are collected in a pressure vessel 15, from which they are sent to the gas-burning-out furnace 12 mentioned above to subject to burning treatment. The so burnt waste gas from the gas-burning-out furnace 12 is then discharged into the chimney 9 through a gas cooler 16 disposed between the gas-burning-out furnace 12 and the chimney 9.

In the stand of technique as described above, a special monitoring means for observation of the burning condition of the gas-burning-out furnace and, in a special occasion, even a combustion assisting means may be required, since the gases from the safety means contain, in general, combustible components only in a low concentration with considerable fluctuation of the gas composition resulting from the warming-up operation of the coal gasifying furnace.

In addition, a possible secondary environmental pollution from the gas burning-out treatment due to occurrence of so-called thermal nitrogen oxides may bring about necessity of further installation for the removal of them. The theoretical relationship between the amount of thermal nitrogen oxides occurring after 0.5 second of the reaction and the temperature therefor is as given in FIG. 4. As is seen, the amount of occurrence of the thermal nitrogen oxides tends to increase steeply above 1600° C.

In the practice, it takes usually several hours for a warming-up operation of the coal gasifying furnace 1 and of the gas purification unit 3 of a composite coal gasification-power plant, depending on the scale of the plant, while operating the gas-burning-out furnace 12 or the flare stack, causing thus a considerable loss of thermal energy with the increase of number of repeated warming-up operations.

OBJECT AND SUMMARY OF THE INVENTION

The first aspect of the present invention is directed to the solution of the problems of the stand of technique described above, by providing a composite coal gasification-power plant, which comprises a coal gasifying furnace, a gas cooler operative to recover the sensible heat of the gas produced in the coal gasifying furnace by generating steam by the heat so recovered, a gas purification unit operative to remove impurities contained in the so cooled gas, a gas-turbine electric power generating unit having a burner for burning the gas purified in the gas purification unit, a waste heat boiler operative to recover the heat contained in the exhaust gas from said gas turbine by generating steam by the so recovered heat and a steam-turbine electric power generating unit fed by the steams from said gas cooler and from said waste heat boiler, characterized in that said composite power plant further comprises an additional combustion unit disposed parallel to said burner of the gas-turbine power generating unit and arranged operative to burn out the gas turbine exhaust gas during the start-up operation of the plant and to supply its combustion exhaust gas to said waste heat boiler.

The subject matter of the second aspect of the present invention is a composite coal gasification-power plant, which comprises a coal gasifying furnace, a gas cooler operative to recover the sensible heat of the gas produced in the coal gasifying furnace by generating steam by the heat so recovered, a gas purification unit operative to remove impurities contained in the so cooled gas, a gas-turbine electric power generating unit having a burner for burning the gas purified in the gas purification unit, a waste heat boiler operative to recover the heat contained in the exhaust gas from said gas turbine by generating steam by the so recovered heat and a steam-turbine electric power generating unit fed by the steams from said gas cooler and from said waste heat boiler, characterized in that said composite power plant further comprises an additional combustion unit operative to effect to burn out the gas turbine exhaust gas during the start-up operation of the plant and/or released gases from safety valves arranged in the power plant and to supply the combustion exhaust gas to said waste heat boiler.

According to the first aspect of the present invention, the noxious and combustible gases produced during the warming-up operation of a composite coal gasification-power plant are burnt out in an additional combustion unit to make them innoxious and the sensible heat contained in the combustion gas is recovered in a waste heat boiler in order to attain an efficient energy utilization.

According to the second aspect of the present invention, the noxious and combustible gases exhausted from the burner of a gas turbine during the start-up of the plant and/or those released from safety valves arranged in a composite coal gasification-power plant upon their operation are burnt in an additional combustion unit to make them innoxious and the sensible heat contained in the combustion gas is recovered in a waste heat boiler.

Thus, by the first aspect of the present invention, it is made possible to treat the noxious and combustible gases occurring in a composite coal gasification-power plant into innoxious state in a practical and economical way under attainment of utilization of the heat energy which has hitherto been discarded without making use of into the atmosphere with simultaneous environmental preservation, and thus, a practical and economical composite coal gasification-power plant is provided, since the noxious and combustible gases produced from the coal gasifying furnace during start-up operation thereof are burnt in an additional combustion unit disposed parallel to the burner of the gas turbine and the sensible heat of the combustion gas therefrom is recovered in the waste heat boiler.

According to the second aspect of the present invention, it is made possible to treat the gases released from various safety valves in a composite coal gasification-power plant in a practical and economical way into innoxious state under attainment of utilization of the heat energy which has hitherto been abandoned without making use of it into the atmosphere with simultaneous environmental preservation, and thus, a practical and economical composite coal gasification-power plant is provided, since the noxious and combustible gases released from the safety valves upon occasional operation thereof are burnt out in the additional combustion unit to make them innoxious and the sensible heat of the combustion gas exhausted therefrom is recovered in the waste heat boiler.

DETAILED DESCRIPTION OF PREFERRED EMBODIMENTS

Below, the present invention is further described by way of Examples with reference to the appended Drawings.

Figure 1:
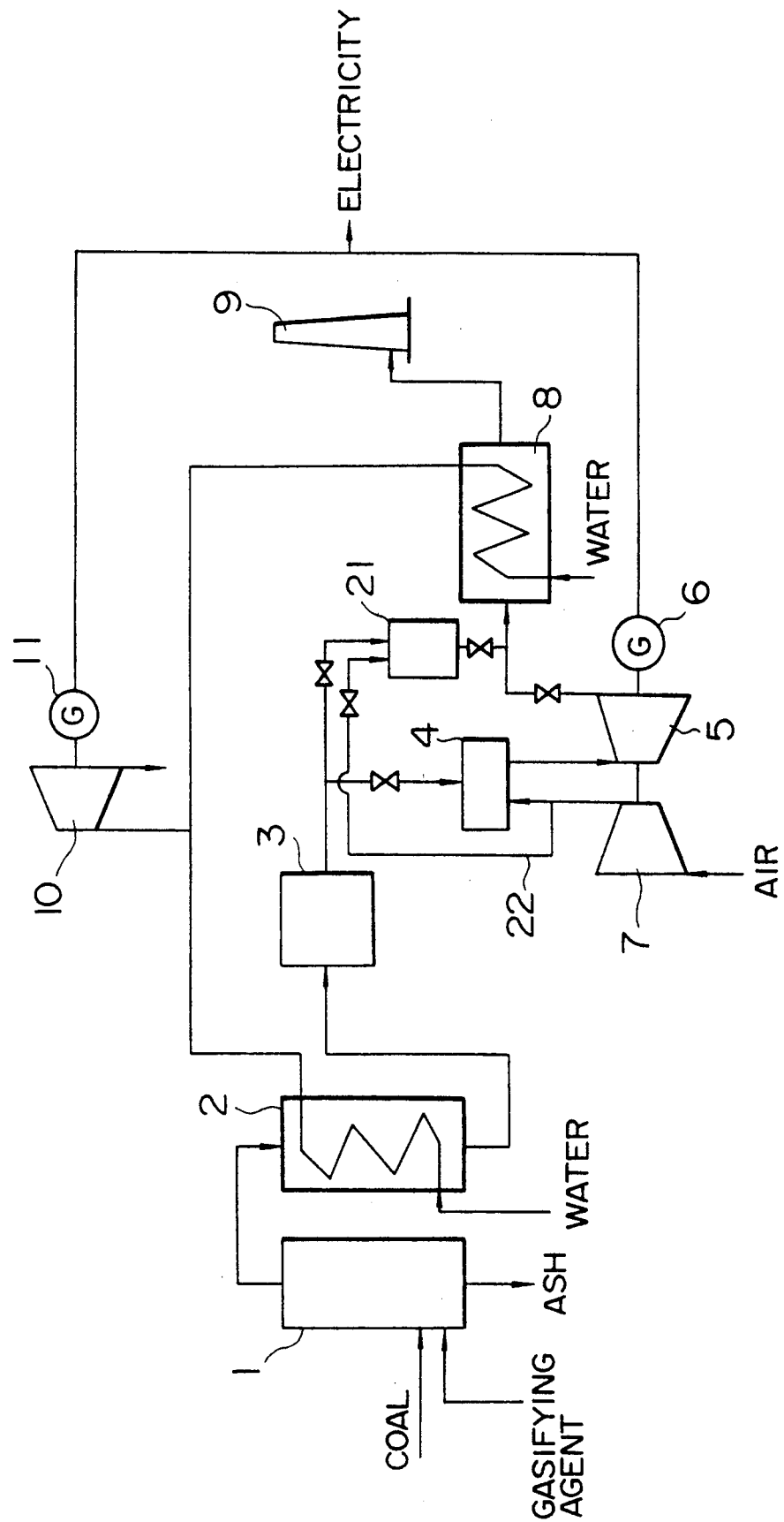
FIG. 1 shows an embodiment of the composite coal gasification-power plant according to the present invention in a flow sheet.
Figure 3:
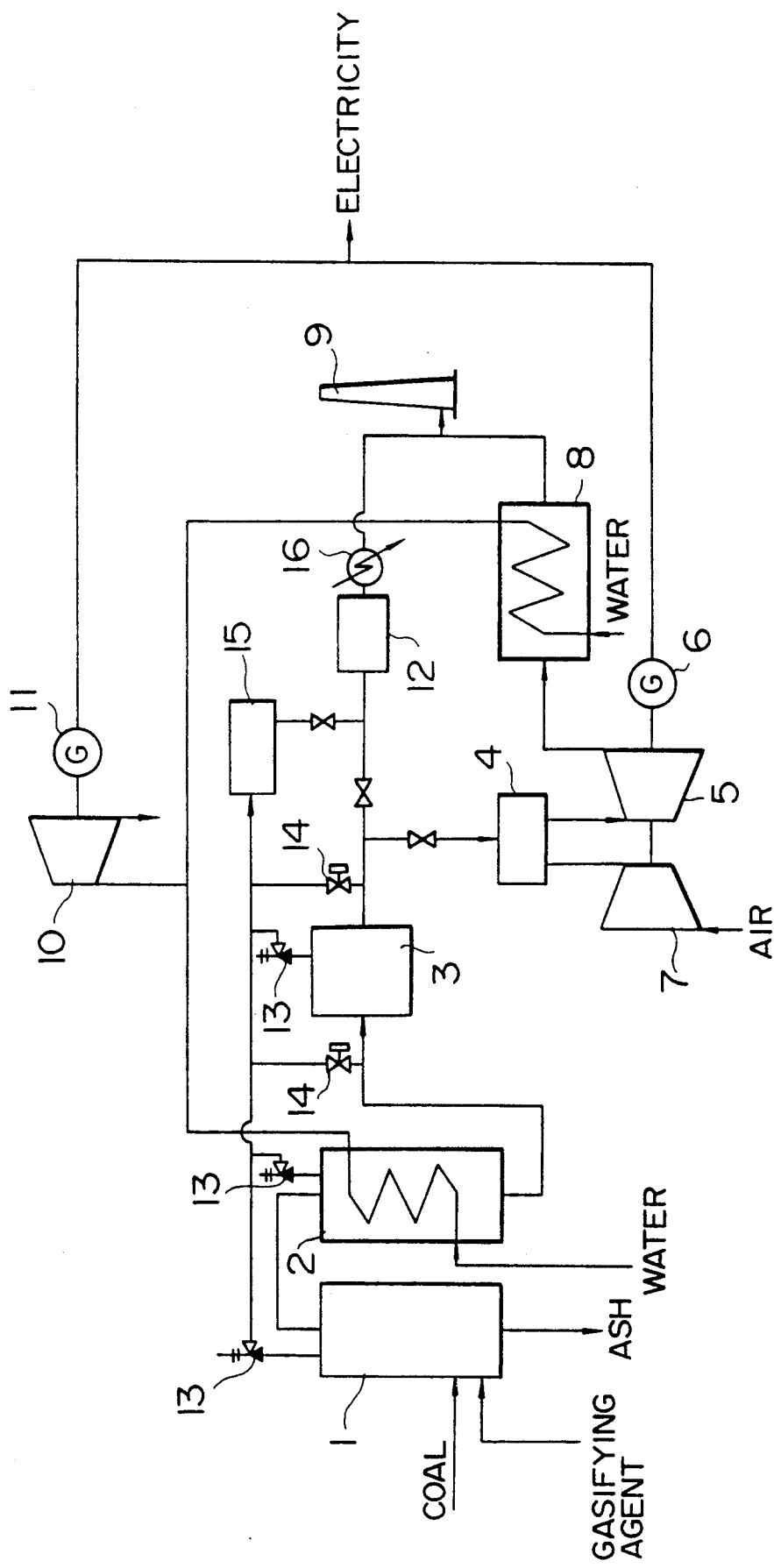
FIG. 3 shows a conventional composite coal gasification-power plant also in flow sheet.
Figure 4:
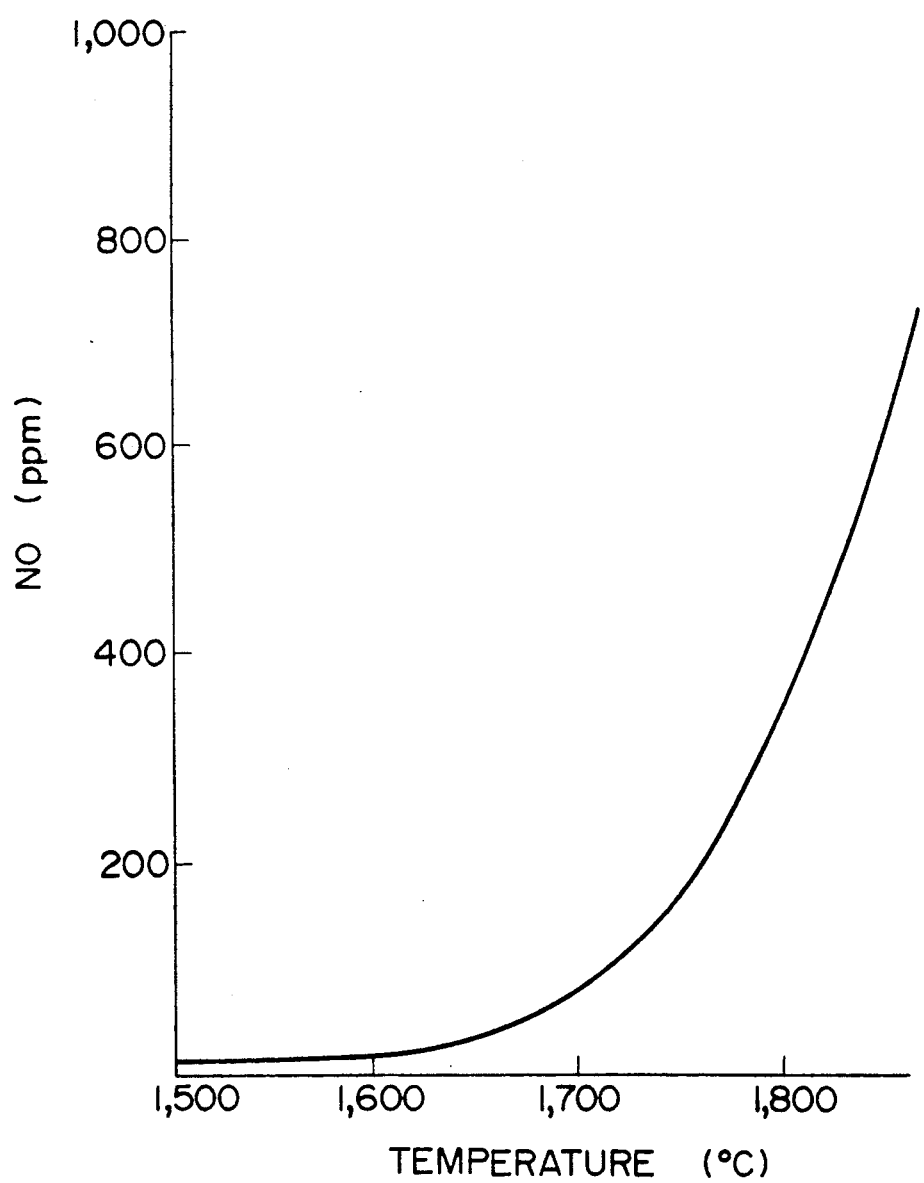
FIG. 4 shows the theoretical relationship between the formation of thermal nitrogen oxides and the reaction temperature.

In FIG. 1, there is shown an Example of the composite coal gasification-power plant of the first aspect of the present invention, wherein the same reference numerals are employed for identical parts as in FIG. 3.

As shown in FIG. 1, coal is charged to a coal gasifying furnace 1 to produce a fuel gas which is fed to a gas cooler 2 operative to cool the fuel gas under generation of steam. A gas purification unit 3 serves for removing impurities contained in the fuel gas cooled in the cooler 2. The so cleaned gas is then fed to a burner 4 for a gas turbine 5 and is burnt therein to produce hot exhaust gas which is discharged into the gas turbine 5 to drive it. The gas turbine 5 drives a power generator 6 and an air compressor 7. These elements 4, 5, 6 and 7 constitute a gas-turbine electric power generation unit. 8 is a waste heat boiler for recovering the heat energy in the gas turbine exhaust gas from the gas-turbine power generating unit to generate steam. The waste gas from the waste heat boiler 8 is discharged into the atmosphere through a chimney 9. The steams generated in the waste heat boiler 8 and in the gas cooler 2 are utilized to rotate a steam turbine 10 for driving a power generator 11. The function and operation of these elements 1 to 11 are identical with those explained already with respect to FIG. 3 and the explanation therefor is, therefore, omitted.

In FIG. 1, the additional combustion unit to be incorporated in the composite coal gasification-power plant according to the first aspect of the present invention is shown at 21. The additional combustion unit 21 is disposed between the outlet of the gas purification unit 3 and the inlet of the waste heat boiler 8 parallel to the burner 4 of the gas turbine. The feed line 22 supplying combustion air to the additional combustion unit 21 is branched out from a connection line connecting the air compressor 7 and the burner 4. It may be possible to employ an air compressor (not shown) for serving to supply combustion air to the combustion unit 21 in the place of the air compressor 7.

On starting the operation of the coal gasifying furnace 1, the gasification reaction will not provide a fuel gas of steady composition but fluctuates considerably not only in the composition but also in the temperature etc., so that the product gas during the warming-up operation will not be utilized for the fuel gas of the gas turbine burner and thus is to be treated in accordance with the present invention so as to permit it to be discharged into the atmosphere. The noxious and combustible gases produced during the warming-up operation are supplied to the additional combustion unit 21 where it is burnt out into innoxious state. The combustion gas resulting therefrom is supplied to the waste heat boiler 8 in order to recover the sensible heat contained therein. The so treated cooled gas is wasted into the atmospher through the chimney 9.

It is preferable to operate the additional combustion unit 21 on a principle of catalytic converter in order to subject the gases fed thereto, which have in general poor heat of combustion and low concentrations of combustible components, to an efficient and promoted chemical reaction. By selecting an adequate catalyst in a suitable amount, it is possible to attain a stable and efficient conversion without necessitating any special means for monitoring and for operation.

Due to the acceleration of burning reaction, a lower temperature can be employed for the catalytic burning as compared with ordinary combustion without catalyst, whereby occurrence of thermal nitrogen oxides that cause secondary environmental pollution will be minimized.

Moreover, the temperature of the catalytic combustion gas is nearly equal to that of the exhaust gas from the gas turnine during its normal run, so that it can be introduced into the waste heat boiler arranged in a succeeding portion in the system, without incorporation of any special temperature-reducing means.

While the pressure in the coal gasifying furnace is lower during the warming-up operation of the plant, it is possible to restore the pressure by catalytic burning to such a level, in which it may correspond to the exhaustion gas pressure from the gas turbine when taking into account of the possible pressure drop in the catalytic burner.

Figure 2:
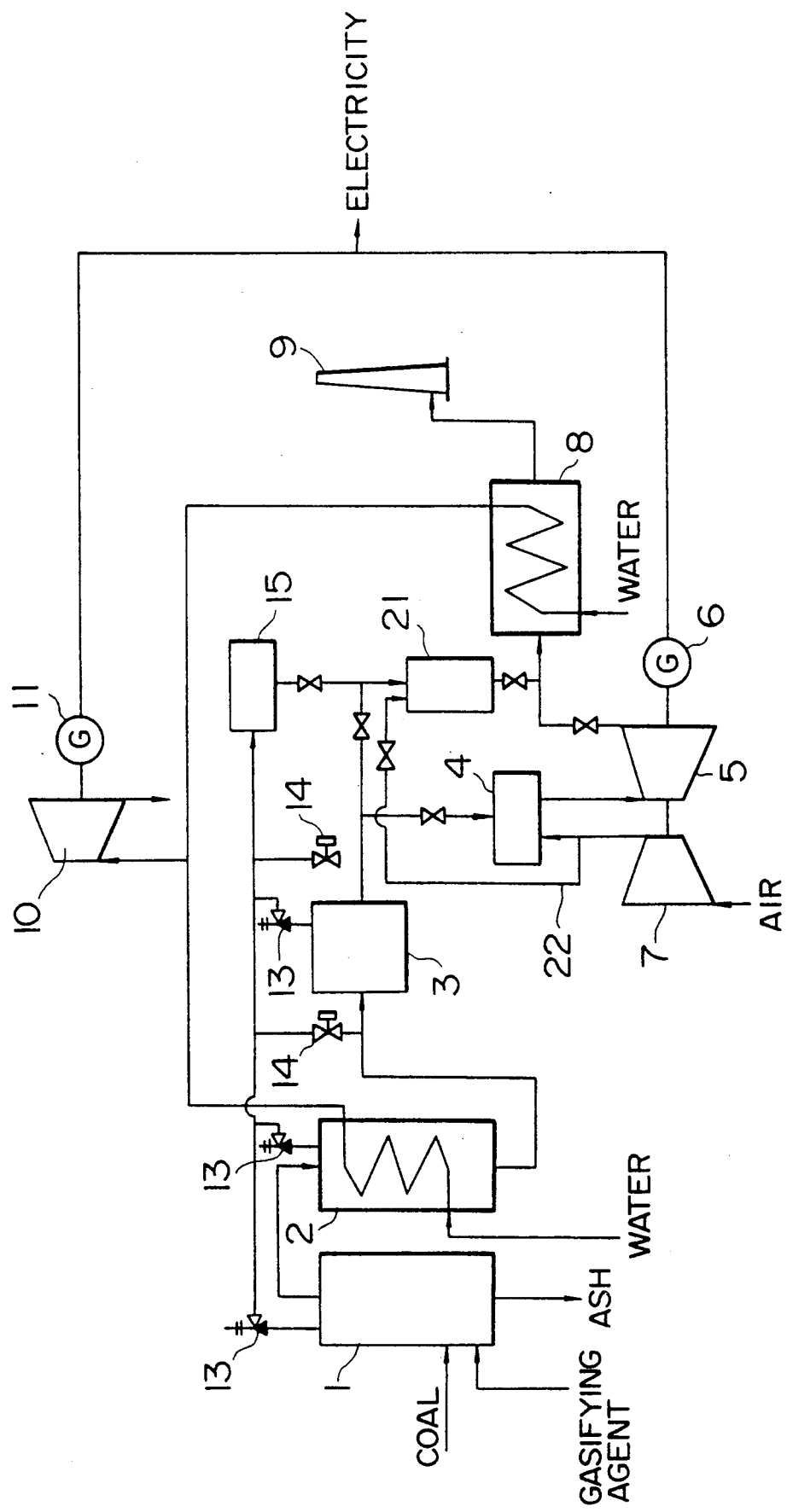
FIG. 2 is a flow sheet of another embodiment of the composite coal gasification-power plant according to the present invention.

Now, description will be directed to the second Example shown in FIG. 2.

This Example shows a composite coal gasification-power plant in which the first aspect of the present invention is combined with the second aspect of the present invention. Here also, the same reference numerals are employed for the same elements as shown in FIG. 1 and the explanation of such elements are therefore omitted.

The noxious and combustible gases released from various safety valves 13 and pressure control valves 14 arranged for the purpose of security confirmation upon their occasional actuation are once collected in a pressure vessel 15 and are fed from here to the additional combustion unit 21 to burn them out into an innoxious state. The combustion gas therefrom is then supplied to the waste heat boiler 8, from which it is discharged into the atmosphere through the chimney 9 after its sensible heat has been recovered.

It is of course preferable and falls under the scope of the present invention that every combustible gas released from, such as relief valves (not shown), is collected in the pressure vessel 15 and supplied then to the additional combustion unit 21.

We claim:

1. A combined power generating plant, comprising:
   a coal gasifying furnace;
   gas cooler means for recovering sensible heat of gas produced in the coal gasifying furnace by generating steam with the heat so recovered;
   gas purification means for removing impurities contained in the so cooled gas;
   a gas-turbine electric power generating unit having a burner for burning the gas purified in the gas purification means;
   waste heat boiler means for generating steam by recovering the sensible heat contained in exhaust gas from said gas-turbine electric power generating unit;
   a steam-turbine electric power generating unit fed by the steam from said gas cooler and from said waste heat boiler; and
   a catalyst burning system disposed between said gas purification means and said waste heat boiler means parallel to said burner of the gas-turbine electric power generating unit so as to burn combustible waste gases produced in the gasifying furnace during the start-up operation of the plant and so that catalytically burned exhaust gas is supplied to said waste heat boiler means.

2. A combined power generating plant as claimed in claim 1, and further comprising valves connected to exhaust gas outlets of the coal gasification furnace, the gas cooler and the gas purification unit so as to cause exhaust gas to flow to said catalyst burning system disposed parallel to said burner of the gas-turbine electric power generating unit.

* * * * *